United States Patent [19]

Sahashi

[11] Patent Number: 5,113,654
[45] Date of Patent: May 19, 1992

[54] SECURING STRUCTURE AND METHOD OF BLADE FOR TORQUE CONVERTER

[75] Inventor: Masayoshi Sahashi, Osaka, Japan
[73] Assignee: Kabushiki Kaisha Daikin Seisakusho, Osaka, Japan
[21] Appl. No.: 686,291
[22] Filed: Apr. 16, 1991

Related U.S. Application Data

[63] Continuation of Ser. No. 408,338, Sep. 18, 1989, abandoned.

[30] Foreign Application Priority Data

Sep. 29, 1988 [JP] Japan ............................ 63-127660[U]

[51] Int. Cl.⁵ .............................................. F16D 33/00
[52] U.S. Cl. .................................. 60/330; 29/889.21; 29/889.23; 416/180; 416/197 C; 416/213 R
[58] Field of Search ............... 60/330; 416/180, 197 C, 416/213 R; 29/889.21, 889.23

[56] References Cited

U.S. PATENT DOCUMENTS

| | | | |
|---|---|---|---|
| 2,466,266 | 4/1949 | Orr | 416/180 |
| 2,493,240 | 1/1950 | Emmert | 416/180 |
| 2,696,660 | 12/1954 | Misch | 416/180 |
| 2,779,292 | 1/1957 | Zeidler | 416/180 |
| 3,408,047 | 10/1968 | Forster et al. | 416/197 C |

FOREIGN PATENT DOCUMENTS 52-19863  2/1977  Japan.
57-38831  8/1982  Japan.

Primary Examiner—Ronald C. Capossela
Attorney, Agent, or Firm—Armstrong, Nikaido, Marmelstein, Kubovcik & Murray

[57] ABSTRACT

A securing structure and method of a blade for torque converter for use mainly in industrial construction vehicles to provide its rigid and easy-to-manufacture construction. The structure includes plural circular blades which are secured to a concave surface of a shell with some space in the circumferential direction, a core ring which extends along the circumferential direction of the shell and is secured to concave peripheries of the blades. A tab fitting in slot of the shell is formed integrally on the convex periphery of the blade. A tab fitting in a slot of the core ring is formed integrally on the concave periphery of the blade. Ribs extending in the circumferential direction of the shell are only formed on both ends of the convex periphery and concave periphery of the blade. The convex periphery and the concave periphery are brazed to the shell and the core ring respectively.

4 Claims, 6 Drawing Sheets

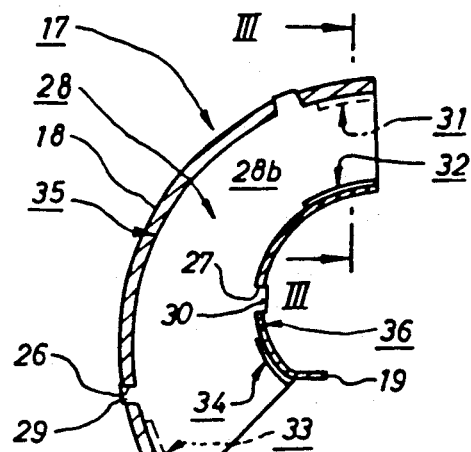
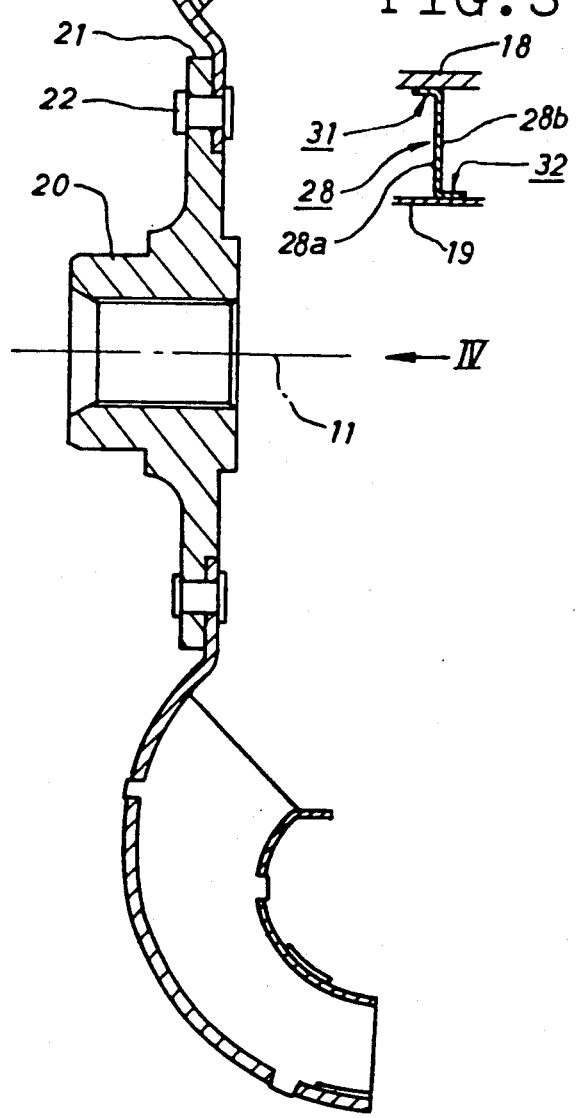

SECURING STRUCTURE AND METHOD OF BLADE FOR TORQUE CONVERTER

This application is a continuation of application Ser. No. 408,338 filed Sept. 18, 1989, abandoned.

BACKGROUND OF THE INVENTION

1. Field of the Invention

This invention relates mainly to a securing structure of blade for torque converter for use in industrial construction vehicles such as a fork lift truck etc., and especially to a securing structure and a method of a blade suitable for a torque converter turbine etc.

2. Description of the Invention

As illustrated in FIG. 9 and FIG. 10, a torque converter 100 for use in industrial construction vehicles generally has such a structure that plural metal blades 102 formed into annular shape (each one is shown in FIG. 9 and FIG. 10 respectively) are installed on a concave surface of a turbine shell 101, flanges 103 and 104 extending in opposite directions with each other along the circumference of the shell 101 are formed integrally and entirely on a convex periphery and a concave periphery of the blade 102, respectively. The flange 103 and 104 are tacked to the surface of the shell 101 and the outside surface of a core ring 105 by spot welding, respectively.

However, in such structure, dispersion of installing distance and position of the blade 102 may occur because of the difficulty for locating the blade 102. The spot welding may also be impossible in some configuration of the blade 102, so that hand work must be employed. Thus, a manufacturing cost has been expensive. Moreover, the formation of these flanges 103 and 104 formed entirely on the convex and concave peripheries has increased total weight of whole torque converter. The formation would affect a flow of fluid (working oil).

Therefore, in recent years, a securing structure of blade to a torque converter 120 (only a turbine portion is shown) for use in a general passenger car has been adopted for industrial construction vehicles.

Such structure includes plural circular blades 122 which are secured to a concave surface of a shell 121 with some space in the circumferential direction. A core ring 123 which is secured to a concave periphery of the blade 122 and extends along the circumferential direction of the shell 121. Slots 126 and 127 in which tabs 124 and 125 of the blade 122 are fitted are formed in the shell 121 and the core ring 123 respectively. An inlet portion X1 of the convex periphery of the blade 122 is tacked by brazing when a turbine wheel is assembled, and then the convex periphery of the blade 122 and concave periphery are brazed.

The structure has an advantageous feature that positioning of each blade can be done easily when tacking by brazing. However, in the industrial construction vehicles such as fork lift trucks, special large loads must be required because changes of forward/backward shifting are carried out more frequently than general vehicles such as a passenger car, and the turbine wheel may rotate in reverse direction when the change of forward/backward shifting is carried out. It is ascertained by experiments that, when the above-mentioned structure of the torque converter 120 is applied to such type of vehicle, a crack 130 as shown by FIG. 12 will be produced because of the excessive large torque load transmitted to the portion adjacent to an inlet of the blade 122. When thickness of the blade 122 is increased in order to avoid the above trouble, a collision loss of fluid becomes large because a pressure area of the inlet of the blade 122 denoted by 131 increases (FIG. 13). The pressure area of the outlet of the blade 122 denoted by 132 also becomes large, so that eddies 133 (FIG. 14) may be occur at the place adjacent to the fluid outlet end face 132 to cause an occurrence of cavitation.

An object of the present invention is to solve the above-mentioned trouble by employing ribs which extend in a circumferential direction of the shell and are only formed on both ends of the convex periphery and concave periphery of the blade, and by brazing the convex periphery and concave periphery to the shell and the core ring respectively.

SUMMARY OF THE INVENTION

In order to solve the foregoing trouble, this invention provides a securing structure of a blade for torque converter including plural circular blades which are secured to a concave surface of a shell with some space in a circumferential direction, a core ring which is secured to concave peripheries of the blades and extends along the circumferential direction of the shell, a tab fitting in a slot of the shell integrally on the convex periphery of the blade, and a tab fitting in a slot of the core ring formed integrally on the concave periphery of the blade. Ribs extending in the circumferential direction of the shell are formed on opposite ends of the convex periphery and opposite ends of the concave periphery of the blade. The convex periphery and concave of the ribs are brazed to the shell and the core ring respectively.

A securing method of a blade for torque converter according to the invention includes a process comprising the steps of disposing the shell, in which slits have previously been formed, horizonally on its back; disposing the blade, which integrally has tabs on the concave periphery and convex periphery and has ribs only on both ends of the peripheries, on the shell so as to place the convex periphery of the blade so as to face the concave surface of the shell and fit the tabs formed on the convex periphery of the blade in the slots of the shell; bending the tabs on the convex periphery of the blade onto the outside face of the shell to locate the blade; securing the blades together with the ribs of the convex periphery to the shell by brazing; and disposing the core ring on the concave peripheries of the blades in a horizontal position, fitting the tab formed on the concave periphery of the blade in the slots of the core ring, bending the tab formed on the concave periphery of the blades onto an inside face of the core ring, and brazing the core ring to the blade assembly.

(Function)

The tab, formed integrally on the convex periphery of the blade, is fitted in the slot of the shell, and then bent onto the outside face of the shell to be tacked thereto.

The ribs, formed integrally on the convex periphery of the blade, are brazed to an inside face of the shell after the above-mentioned tacking.

The tab, formed integrally on the concave periphery of the blade, is first fitted in the slot of the core ring, and then bent onto an inside face of the core ring to be tacked thereto.

The ribs, formed integrally on the concave periphery of the blade, are brazed to an outside face of the core ring after the above-mentioned tacking.

BRIEF DESCRIPTION OF THE DRAWINGS

FIG. 2 is a sectional view of a turbine wheel to which this invention is applicable.

FIG. 3 is a sectional view taken along line III—III of FIG. 2.

DESCRIPTION OF THE PREFERRED EMBODIMENTS

Figure 1:
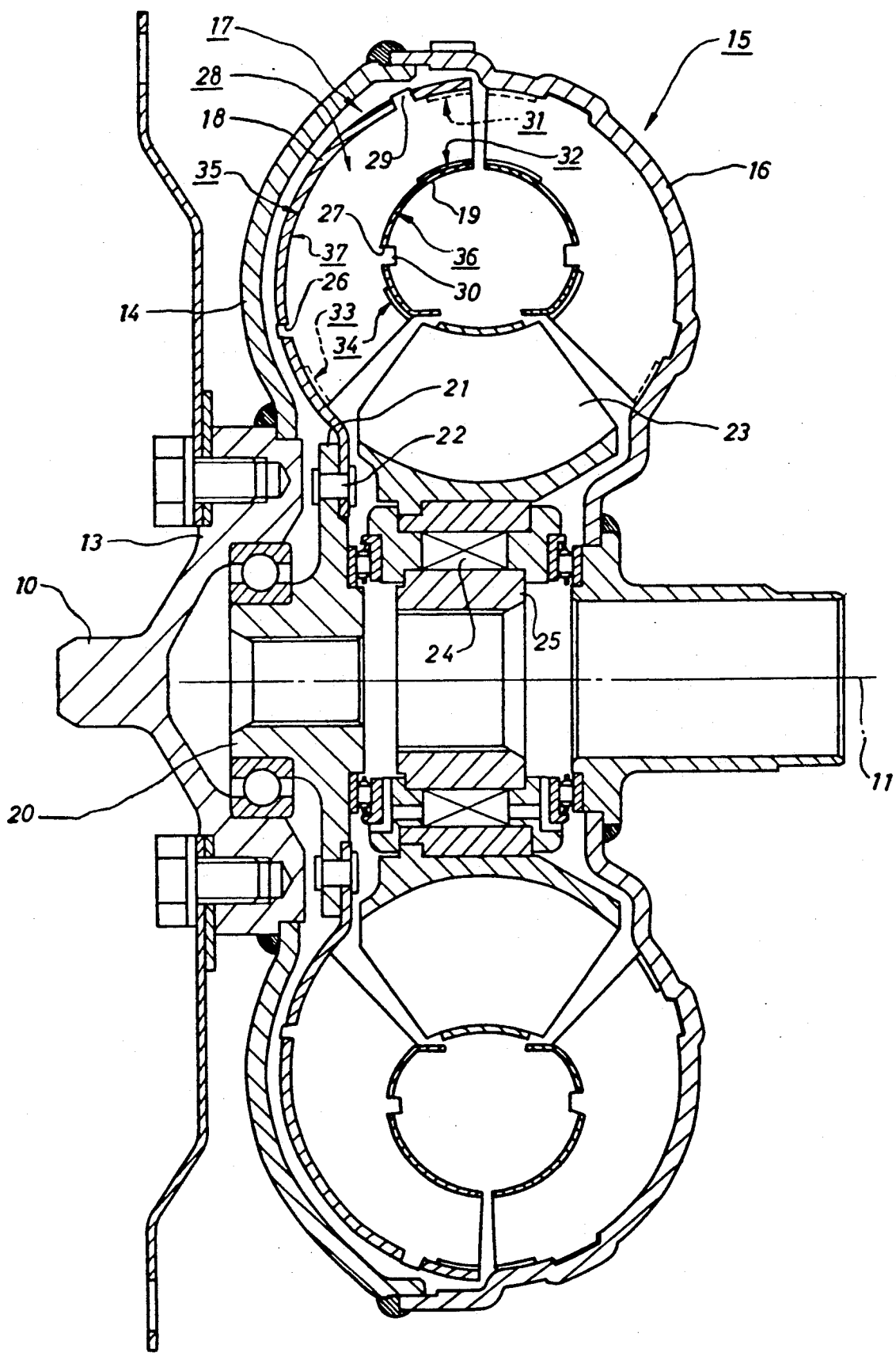
FIG. 1 is a sectional view of the present invention.

In FIG. 1 showing an embodiment of the present invention, 10 is an input shaft of engine, 11 is an output shaft (only its center line is shown) which is the input shaft of a transmission, 13 is a flywheel formed integrally around the input shaft 10, 14 is a front cover, one end of which is secured integrally to the flywheel 13, and the other end of which is secured integrally to one end of an impeller shell 16 of a pump wheel 15. 17 is a turbine wheel, 18 is a turbine shell, 19 is a core ring. 20 is a hub which spline fits onto the output shaft 11, 21 is an outward hub flange extended integrally around the hub 20, 22 is a rivet fastening an outlet end of the turbine shell 18 on the hub flange 21, 23 is a stator, 24 is an one-way clutch, and 25 is an inner race carrying the one-way clutch. The inner race 25 spline fits onto a fixed shaft not shown in the figure.

Many slits 26 and 27 are formed, respectively, in the turbine shell 18 and in the core ring 19 with equal space in the circumferential direction. Tabs 29 and 30, which are formed into corresponding annular shapes respectively, of a blade 28 made of sheet metal fit in the slits 26 and 27.

The tabs 29 and 30 are formed simultaneously together with inlet side ribs 31 and 32 and outlet side ribs 33 and 34 by the press work for producing the blade 28. The ribs 31, 32, 33 and 34 are only formed on both end portions of a convex periphery 35 and a concave periphery 36 of the blade 28, respectively.

Figure 4:
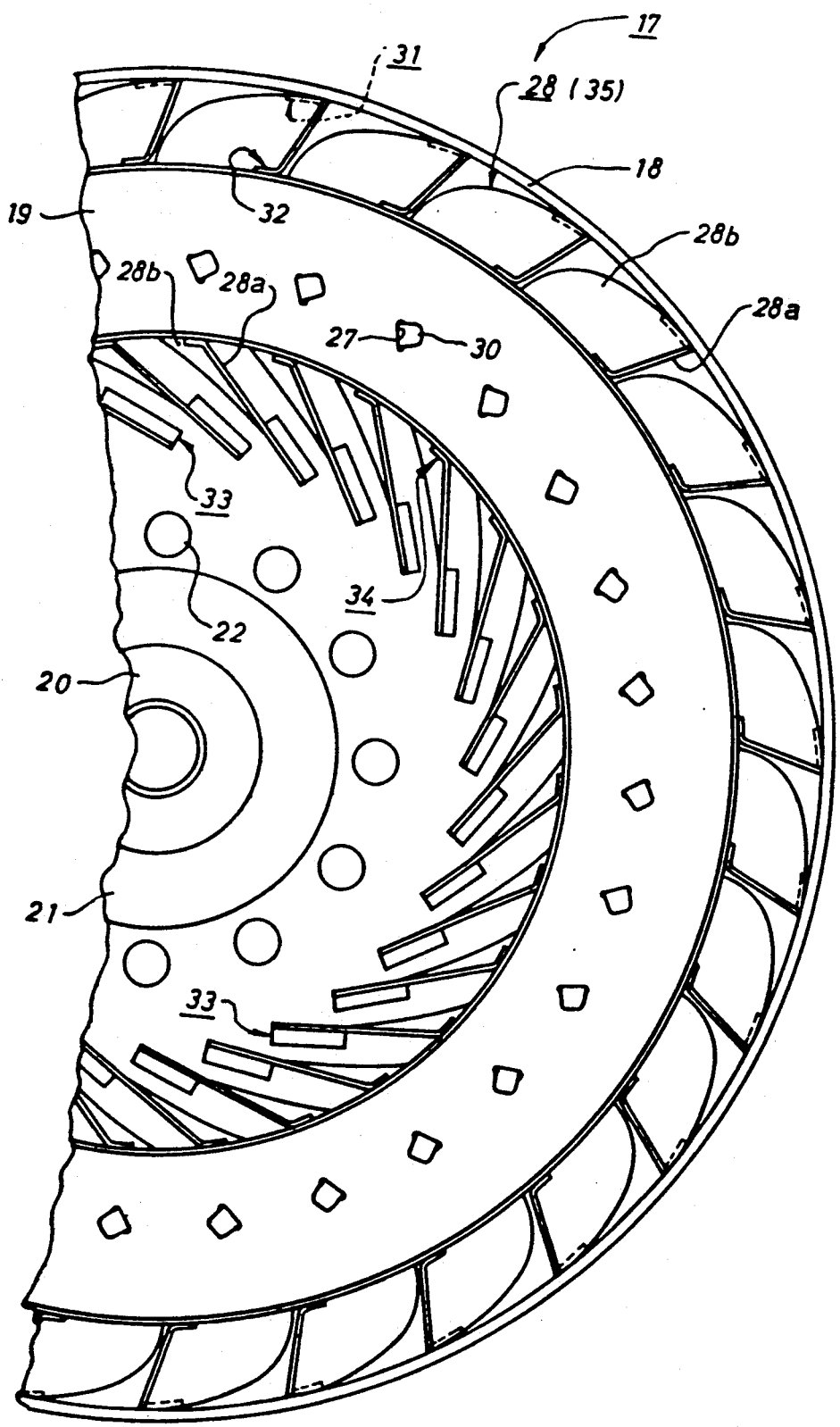
FIG. 4 is a view viewed in a direction of arrow IV of FIG. 2.

As illustrated in FIG. 2, 3 and 4, the ribs 31, 32, 33 and 34 stretch along the circumference direction of the shell 18. In this embodiment, the ribs 31 and 33 formed integrally on opposite ends of the convex periphery 35 (FIG. 2) are so formed as to extend in the opposite direction to the ribs 32 and 34 formed integrally on opposite ends of the concave periphery 36 (FIG. 2), and so as to extends to a concave surface 28a side of the blade 28. The ribs 32 and 34 are so formed so as to extend to a convex surface 28b side of the blade 28.

The assembly process will be described hereunder.

Figure 5:
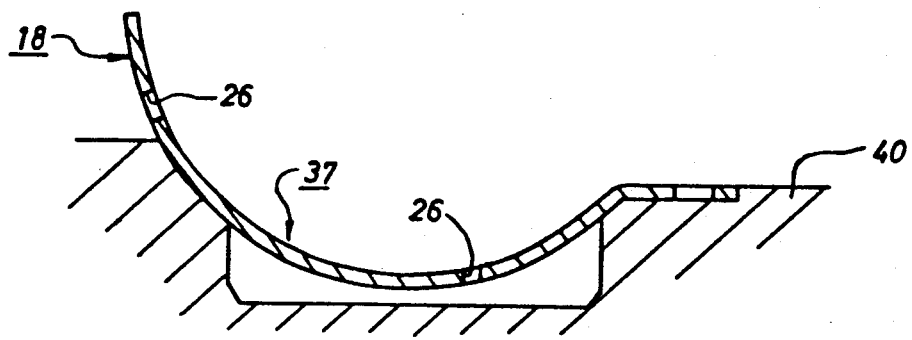
FIG. 5 through FIG. 8 are sectional views of the shell showing an assembly process of the present invention.

Firstly, as illustrated in FIG. 5, the shell 18 previously provided with slits 26 is supported horizontally by a gauge 40 on its back.

Figure 6:
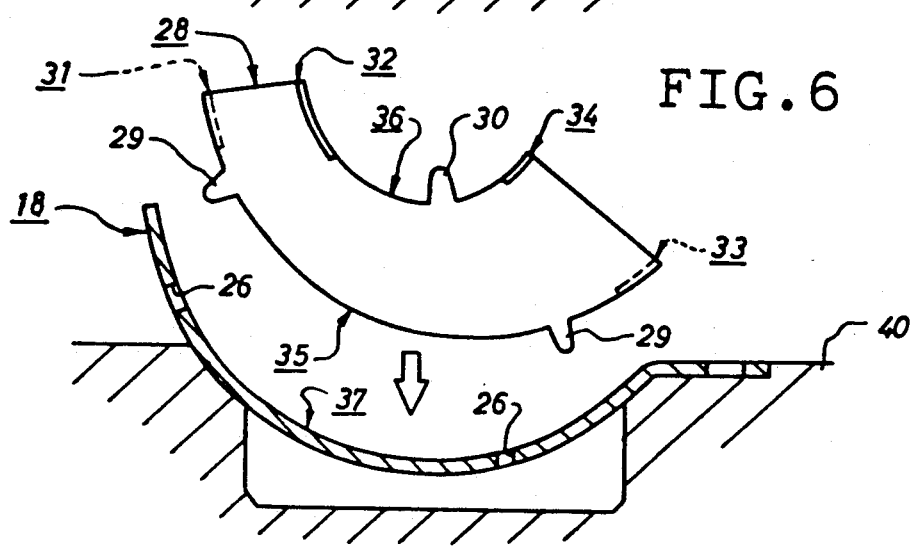

Secondly, as illustrated by an upper part of FIG. 6, the blade 28 is provided integrally with the tabs 29 and 30 and ribs 31, 32, 33 and 34 formed by a press work, for example, and is so disposed that the convex periphery 35 is faced to the concave surface 37 of the shell 18, and the tabs 29 are fitted in the slits 26 of the shell 18.

Figure 7:
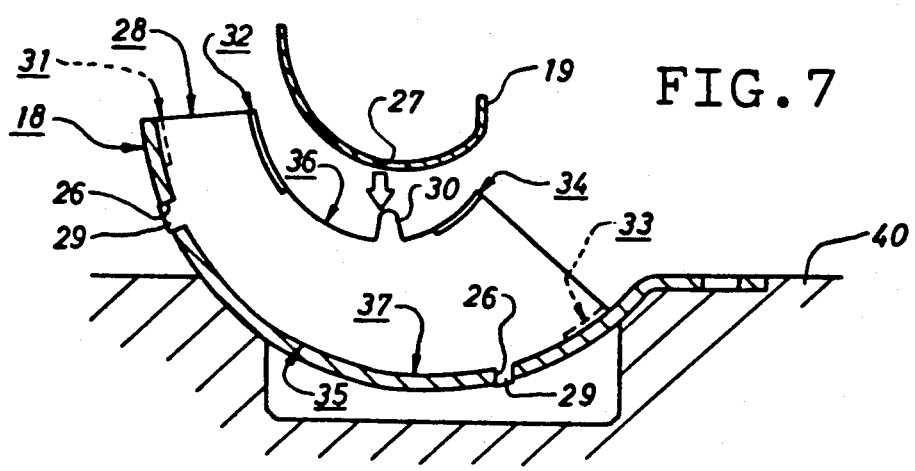

Thirdly, as illustrated by FIG. 7, the tabs 29 are bent onto the outside face of the shell 18 to locate the blade 28, and then the blade 28 is secured to the shell 18 by a brazing work. The ribs 31 and 33 formed integrally on the convex periphery 35 are also secured to the concave surface 37 of the shell 18 by the brazing work. As described above, this invention employs the structure which enable the tabs 29 formed on the convex periphery 35 first to fit in the slots 26 of the shell 18 and then to be bent onto the outside face of the shell 18, so that the blade 28 can be located easily when installing the blade on the shell 18. Further, because the ribs 31 and 33 are only formed on the opposite ends of the convex periphery 35 of the blade 28, they do not affect the flow of working oil. Moreover, because the ribs 31 and 33 are secured very rigidly, there is no fear of occurrence of crack in the vicinity of the blade 28 inlet to which frequent stress is applied.

Figure 8:
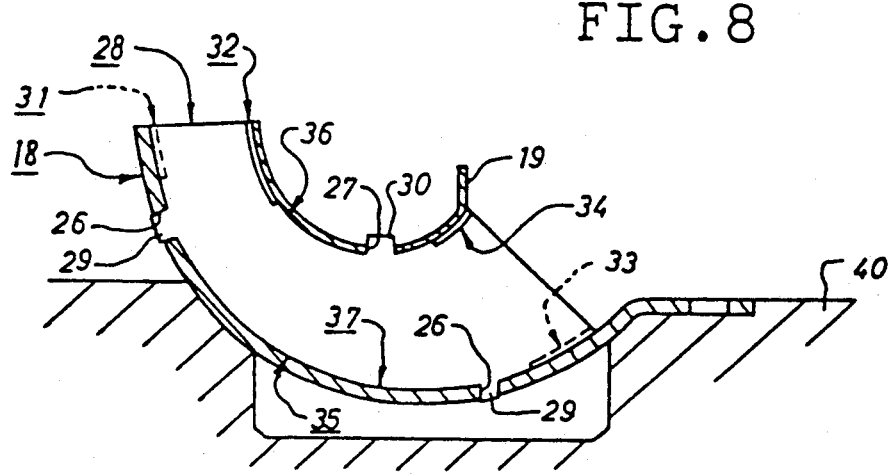
Figure 12:
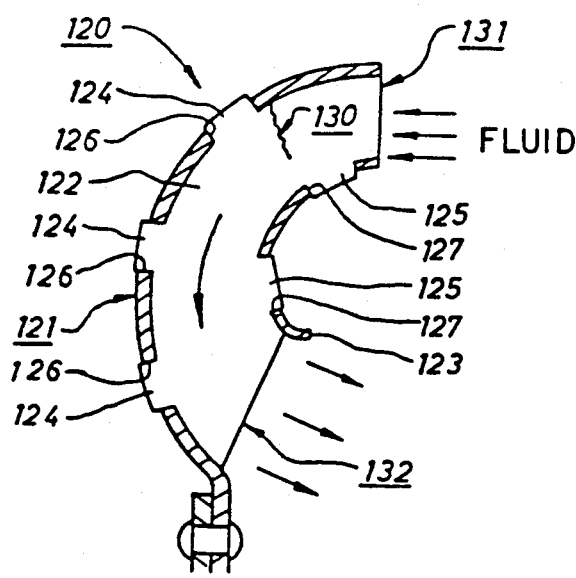
FIG. 11 and FIG. 12 are schematic partial sectional views of a turbine wheel applied to a vehicle for automobile.
Figure 13:
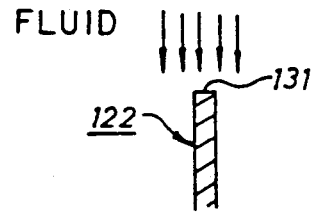
FIG. 13 is a schematic partial cross-sectional view of a blade end face showing a state where fluid collides against the blade end face.
Figure 14:
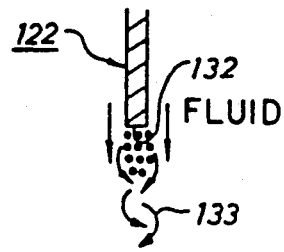
FIG. 14 is a schematic partial cross-sectional view of a blade end face showing a state where eddies are produced by fluid in the vicinity of the blade end face.
Figure 9:
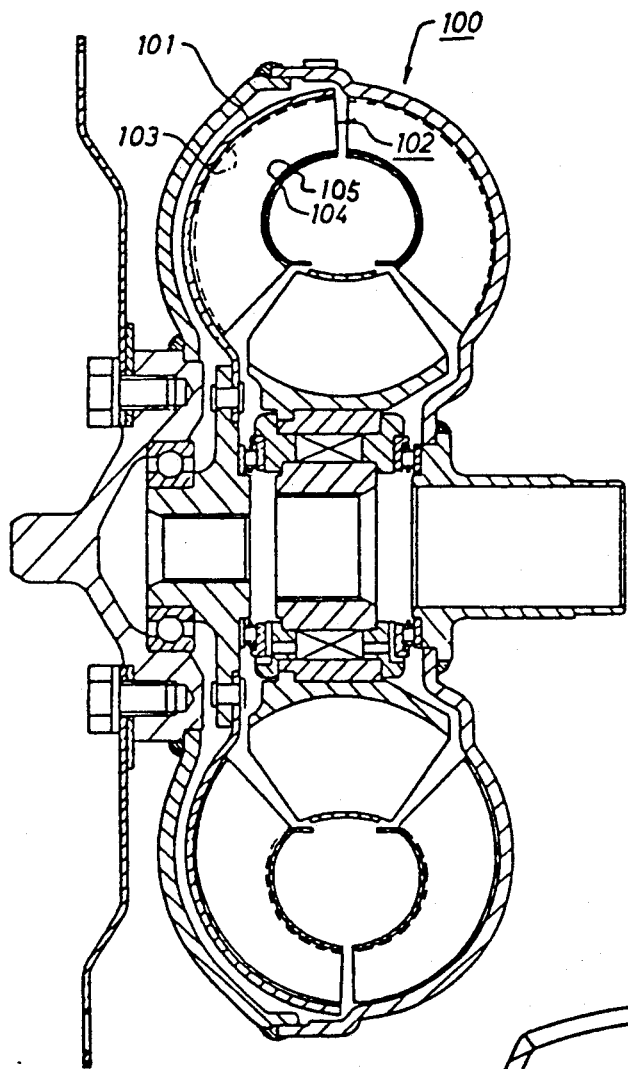
FIG. 9 is a sectional view of a conventional torque converter.
Figure 11:
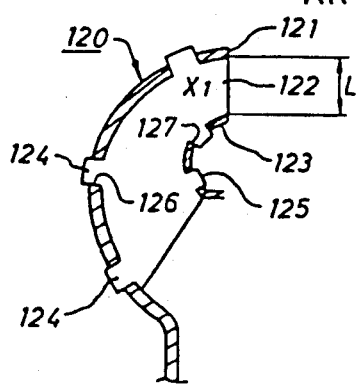
Figure 10:
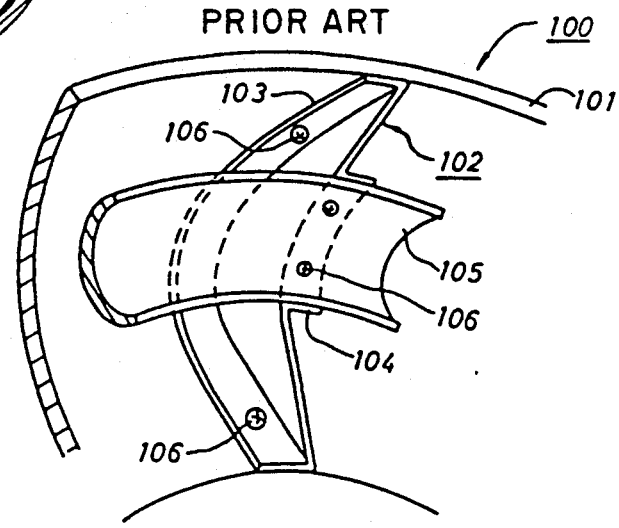
FIG. 10 is a partial oblique view of a turbine wheel of the conventional torque converter.

Finally, as shown in an upper part of FIG. 7, the core ring 19 is disposed on the concave peripheries 36 of the blades 28 in the horizontal position, each of tabs 30 is first fitted in each of slots 27 of the core ring 19, and then bent onto and brazed to the inside face of the core ring 19, thus secure the core ring 19 to the blade assembly to complete the final structure as shown by FIG. 8. Further, the ribs 32 and 34 formed integrally on the concave periphery 36 of the blade 28 are brazed firmly to the outer peripheral surface of the core ring 19 by the brazing work. Also in this process, the tab 30 formed on the intermediate portion of the concave periphery 36 is first fitted in the slot 27 of the core ring 19 in the same way as the process shown by FIG. 5 and FIG. 6, so that it becomes easy to locate the core ring 19 and improve the securing strength of the core ring 19 by the ribs 32 and 34.

Function will be described referring to FIG. 1.

When an engine torque is transmitted to the input shaft 10, the torque is transmitted through the flywheel 13, the front cover 14 and the impeller shell 16 to the pump wheel 15, thereby working oil from an oil pump not shown in the figure is driven, and the working oil flows to the turbine wheel 17 side to transmit the torque to the turbine wheel 17. The torque is transmitted from each blade 28 to the output shaft 11 through the turbine shell 18, the hub flange 21 and the hub 20. In the above-mentioned function; the stator 23 stands until the speed ratio reaches a clutch point, and then the stator 23 rotates on the one-way clutch 24 relatively to the not shown fixed shaft onto which the inner race 25 fits, when the speed ratio exceeds the clutch point.

During the above operation, the blades 28 of the turbine impeller 17 receive a large load of the working oil. Especially in the industrial construction vehicles, the turbine wheel 17 frequently rotates in the reverse direction during the forward/backward shifting operation of the vehicle, so that the load becomes particularly large in this instance. In the present invention, however, the ribs 31, 32, 33 and 34 extending along the circumference of the shell 18 are only formed integrally on the convex periphery 35 and the concave periphery 36 of the blade 28. The convex periphery 35 and concave periphery 36 are brazed to the shell 18 and the core ring 19 respectively. Therefore, a sufficient durability of the blade 28 can be maintained by these ribs 31, 32, 33 and 34 even if the blade is made of the thin steel plate.

(Effect of the Invention)

As described above, according to the present invention, the ribs 31, 32, 33 and 34 extending along the circumference of the shell 18 are only formed integrally on the opposite ends of the convex periphery 35 and the concave periphery 36 of the blade 28, and the convex periphery 35 and concave periphery 36 are brazed to the shell 18 and the core ring 19 respectively; so that, in the assembly process, the tabs 29 formed integrally on the convex periphery 35 of the blade 28 are first fitted in the slots 26 of the shell 18 and then bent onto the outside face of the shell 18 to be tacked thereto. Further, when secure the core ring 19, the tab 30 formed integrally on the concave periphery 36 of the blade 28 is first fitted in the slot 27 of the core ring 19 and then bent onto the inside face of the core ring 19 to be tacked thereto. Accordingly, the tacking work becomes very easy and the efficiency of the assembly work can be improved.

Moreover, according to the present invention, because ribs 31 and 32 having high securing strength are formed on the opposite ends of the blade 28, there is no fear of occurrence of cracks in the vicinity of the blade 28 inlet to which frequent stress is applied. Furthermore, because the ribs 31, 32, 33 and 34 are only formed on the opposite ends of the peripheries 35 and 36, they do not affect the flow of working oil. The total weight can be reduced by an amount of omitted intermediate portions of the ribs.

The present invention may be applied to the pump wheel 15.

What is claimed is:

1. A securing blade structure for a torque converter including plural blades having a convex outer periphery and a concave inner periphery and each secured at its convex outer periphery to a concave inner surface of a shell with spaces on said shell between said blades, a core ring having a convex outer surface secured to said concave inner peripheries of each of said blades, a tab formed integrally on said convex periphery of each said blade and fitted into a slot in said shell, and a tab formed integrally on said concave inner periphery of said blade and fitted into a slot in said core ring; said blades each having ribs extending in the circumferential direction of said shell and formed integrally on opposite ends of said convex outer periphery and said concave inner periphery of each said blade respectively, said ribs extending along and in contact with said concave inner surface of said shell and said convex outer surface of said core ring, respectively, and being brazed to said shell and said core ring respectively, said ribs formed integrally on opposite ends of said convex outer periphery of said blades are so formed as to extend in the opposite direction to said ribs formed integrally on opposite ends of said concave inner periphery of said blades, and to extend to the concave inner periphery surface side and the convex outer periphery side of said blade.

2. A securing structure of a blade for torque converter as set forth in claim 1, in which said slots are formed in said shell and core ring with equal space in their circumferential directions respectively.

3. A securing structure of a blade for torque converter as set forth in claim 1, in which said shell composes a turbine wheel for a torque converter.

4. A securing structure of a blade for torque converter as set forth in claim 3, in which said shell adjacent to the outlet end is fastened to a hub flange by caulking rivets.

* * * * *